(12) United States Patent
Wentland et al.

(10) Patent No.: US 7,766,521 B2
(45) Date of Patent: Aug. 3, 2010

(54) AIRCRAFT INTERIOR SIDEWALL PANELING SYSTEMS PROVIDE ENHANCED CABIN LIGHTING AND VENTILATION

(75) Inventors: Mark E. Wentland, Lynnwood, WA (US); Thomas L. LeBlanc, Mukilteo, WA (US); Charles K. Lau, Everett, WA (US)

(73) Assignee: The Boeing Company, Chicago, IL (US)

( * ) Notice: Subject to any disclaimer, the term of this patent is extended or adjusted under 35 U.S.C. 154(b) by 283 days.

(21) Appl. No.: 11/864,550

(22) Filed: Sep. 28, 2007

(65) Prior Publication Data

US 2008/0266887 A1    Oct. 30, 2008

Related U.S. Application Data

(60) Provisional application No. 60/914,565, filed on Apr. 27, 2007.

(51) Int. Cl.
*B64D 47/02* (2006.01)
(52) U.S. Cl. .................................. 362/471; 244/129.3
(58) Field of Classification Search ......... 362/470–473; 244/129.3
See application file for complete search history.

(56) References Cited

U.S. PATENT DOCUMENTS

| 2,396,039 | A | * | 3/1946 | Burton et al. | ............ 244/118.1 |
| 4,541,595 | A | * | 9/1985 | Fiala et al. | ............ 244/129.3 |
| 4,903,175 | A | * | 2/1990 | Cotton | ........................ 362/471 |
| 6,601,799 | B2 | * | 8/2003 | Lau et al. | ................ 244/129.3 |
| 2004/0090787 | A1 | * | 5/2004 | Dowling et al. | ............. 362/471 |

* cited by examiner

*Primary Examiner*—Stephen F Husar
(74) *Attorney, Agent, or Firm*—Haynes & Boone, LLP.

(57) ABSTRACT

An interior sidewall panel assembly for a passenger aircraft includes a generally planar sidewall structural panel having a D-shaped window opening with an apex that is directed rearward and tilted slightly upward relative to the horizontal, a window assembly disposed in the window opening, an indirect lighting module disposed at a forward edge of the D-shaped window assembly and arranged to direct light forwardly such that the light washes onto a rear margin of a structural panel of a next adjacent panel assembly located immediately forward of the light module, and a kick panel disposed at a lower margin of the structural panel that incorporates cabin ventilation or decompression ducts and vents and an accent light adapted to direct light onto a cabin floor of the aircraft.

19 Claims, 12 Drawing Sheets

AIRCRAFT INTERIOR SIDEWALL PANELING SYSTEMS PROVIDE ENHANCED CABIN LIGHTING AND VENTILATION

RELATED APPLICATIONS

This application claims the benefit of U.S. Provisional Application 60/914,565, filed Apr. 27, 2007.

BACKGROUND

This disclosure relates to aircraft interiors in general, and in particular, to interior sidewall paneling systems for passenger aircraft that incorporate a large, unique window shape to enhance passenger visibility, forward-facing indirect sidewall lighting wash lights, substantially enhanced foot area lighting, cabin decompression ventilation, and a flexible, laterally overlapping (i.e., shingled) panel interconnection design.

Currently, all passenger aircraft interior sidewall panel designs use direct lighting that radiates from above the sidewall and washes down along the panel, and also typically incorporate traditional, oval shaped windows. Since the overhead light washes down the panels in the conventional design, when the passengers look up, the light source is disconcertingly visible to them. Conversely, the wall and floor areas adjacent to the passenger's feet are relatively dark, making it difficult, for example, for them to move around easily in such areas and to find carryon luggage stowed on the floor of the cabin beneath the seats.

Additionally, since the passengers' windows are oval shaped and relatively small in area, they make it difficult for some passengers, e.g., those not situated immediately adjacent to a window, to see out of the aircraft easily without having to stretch or stoop.

A long-felt but as yet unsatisfied need therefore exists for interior sidewall paneling systems for passenger aircraft that overcome the above lighting problems and provide passengers of all sizes and seat positions with an enhanced view out of the aircraft.

BRIEF SUMMARY

In accordance with the exemplary embodiments described herein, aircraft interior paneling systems are provided that create a unique "look and feel" to an aircraft's cabin interior and that enhance space and accent interior features by the novel use of lighting. The systems afford a futuristic cabin sidewall that engender a unique passenger experience by providing a window shape optimized to provide a view out of the airplane for different sized passengers, an intimate yet spacious sidewall environment, lighting that does not shine directly into the passengers' eyes, and floor safety lighting that enables passengers to more easily find their luggage stowed beneath the seats and move around inside of the aircraft safely. The paneling systems take into consideration passenger space and lighting requirements of modern passenger aircraft, i.e., enhanced seating area and innovative window treatments.

In one exemplary embodiment, the system comprises a panel assembly, including a outwardly curved sidewall panel that incorporates an elongated, D-shaped window opening, the apex of which is directed rearward and tilted slightly upward relative to the horizontal, within which a window assembly is received. The window assembly comprises a correspondingly shaped, transparent window lens having an opaque window reveal extending around its outer periphery, a seal that forms a pressure-tight seal of the window lens to the sidewall panel, and an opaque, adjustable window shade that is slidably moveable across the window opening to block the passage of light therethrough.

The panel assembly also includes an indirect lighting fixture disposed at the forward edge of the D-shaped window assembly. The lighting module includes a light source, such as an array of light emitting diodes, whose light output color and/or intensity can be selectively varied from a remote location, as well as a light bezel and a light lens. The bezel blocks the direct radiation of light into passenger's eyes, and instead, directs it forwardly through the lens, such that the light washes onto the rear side margin of the sidewall panel of the next panel assembly immediately forward of the light fixture.

The exemplary panel assembly further includes a kick panel at its lower end, which in one embodiment, can be formed integral to the wall panel, and in an alternative embodiment, can be provided independently of the panel, and in modular lengths that are the same as or different than the width of the panel. Additionally, the kick panel can incorporate, or provide the ducting and/or grillwork for cabin ventilation or decompression. Advantageously, the kick panel may also provide the location and mounting for one or more indirect lighting sources that are arranged to radiate light onto the cabin floor at the feet of the seated passengers, such that they can see where to place their feet and easily find carryon luggage and other items stowed on the floor of the cabin beneath the seats.

A better understanding of the above and many other features and advantages of the novel paneling system of the present disclosure may be obtained from a consideration of the detailed description of some exemplary embodiments thereof below, especially if such consideration is made in conjunction with the appended drawings, wherein like reference numerals are used to identify like elements illustrated in one or more of the figures thereof.

DETAILED DESCRIPTION

Figure 1:
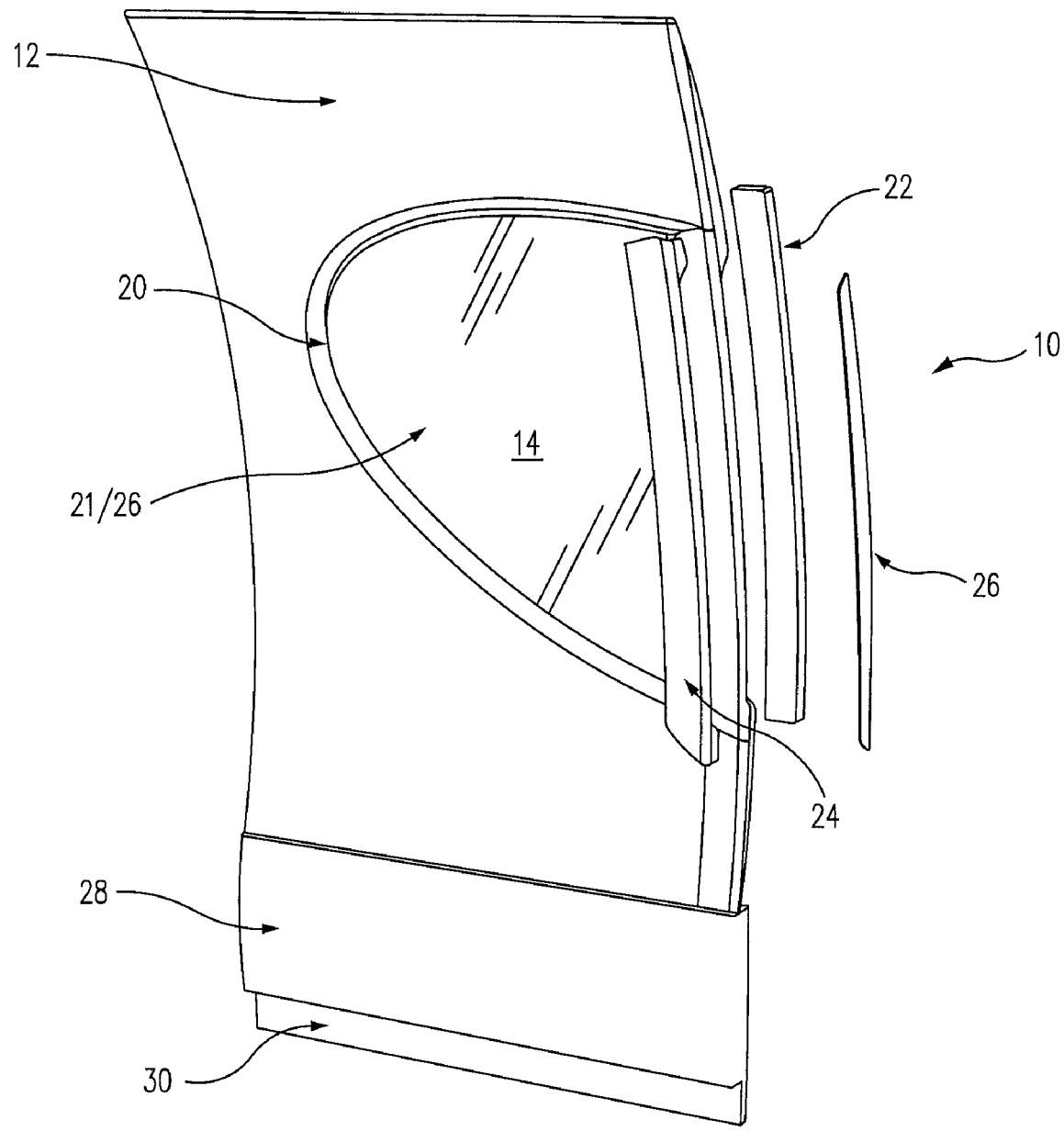
FIG. 1 is an interior, right side, exploded perspective view of an exemplary embodiment a single aircraft sidewall panel assembly in accordance with the paneling system of the present disclosure, showing a sidewall structural panel, an upward tilting, elongated, D-shaped passenger window, interior and exterior window bezels, an indirect lighting module, and a kick plate portion thereof.
Figure 2:
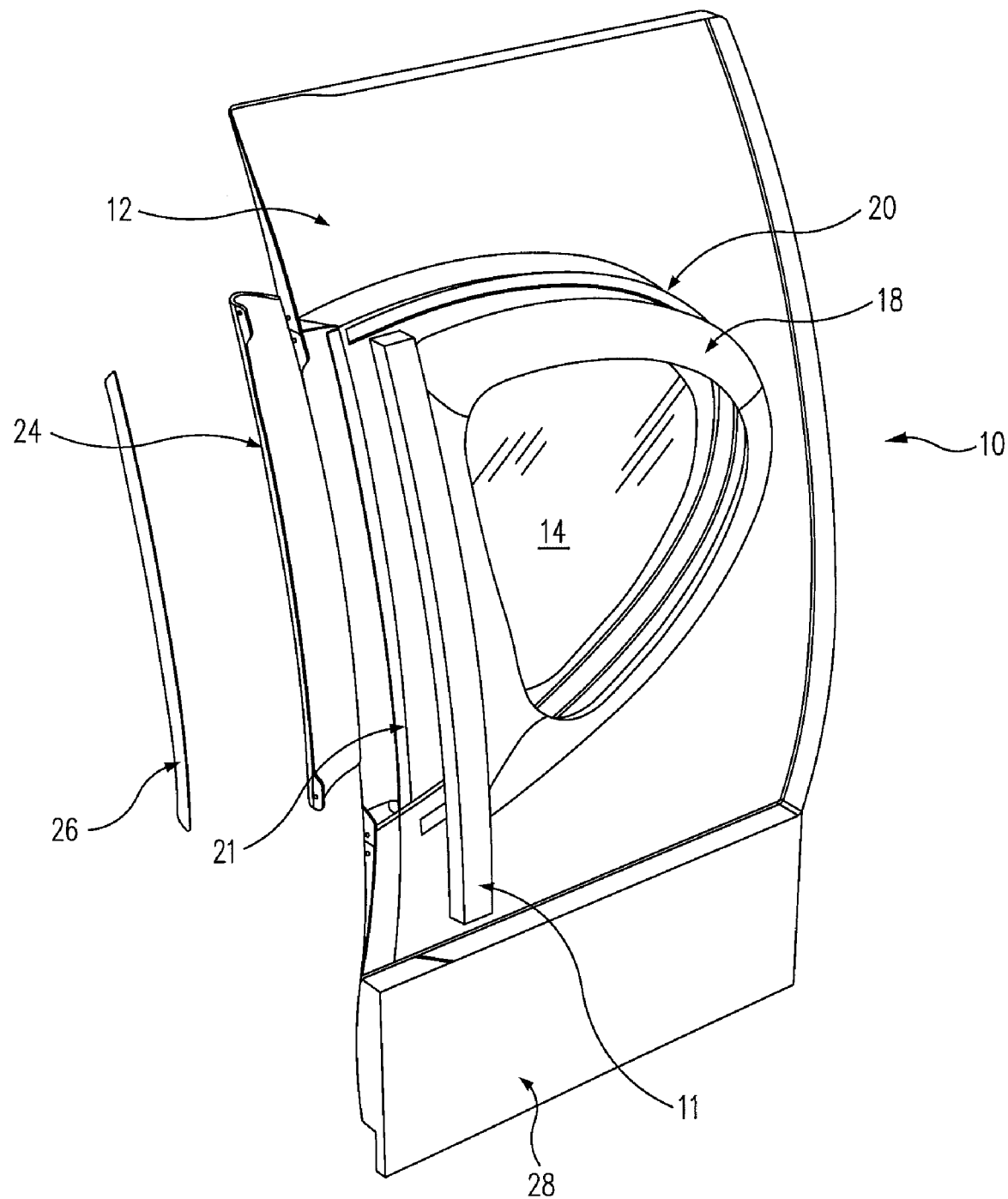
FIG. 2 is an exterior, left side, exploded perspective view of the exemplary panel assembly of FIG. 1.

FIG. 1 is a right side, interior, exploded perspective view of an exemplary embodiment of an aircraft sidewall panel assembly 10 in accordance with the paneling system of the present disclosure, and FIG. 2 is an exterior, left side, exploded perspective view thereof.

Figure 3B:
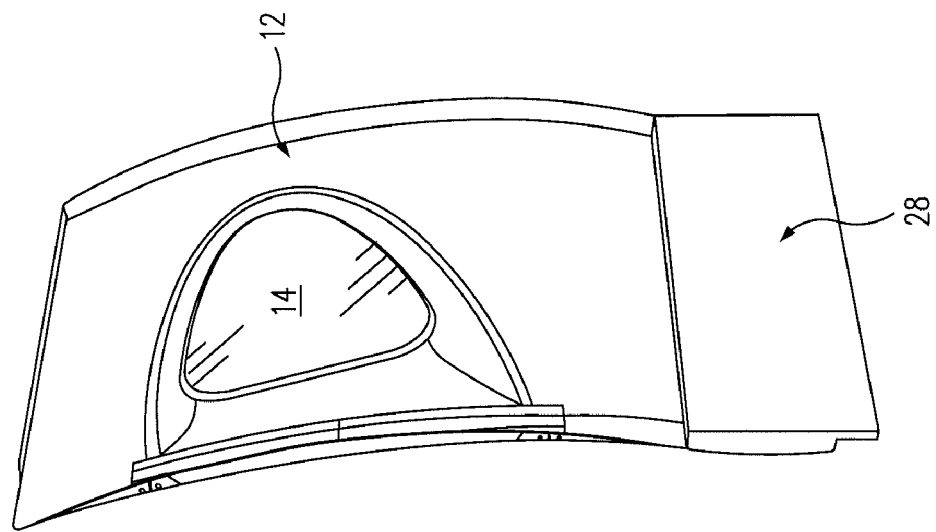
FIGS. 3A and 3B are an inboard, left side perspective view, and an outboard, right side perspective view, respectively, of the structural panel of the panel assembly of FIG. 1, with the window assembly and lighting module omitted.
Figure 3A:
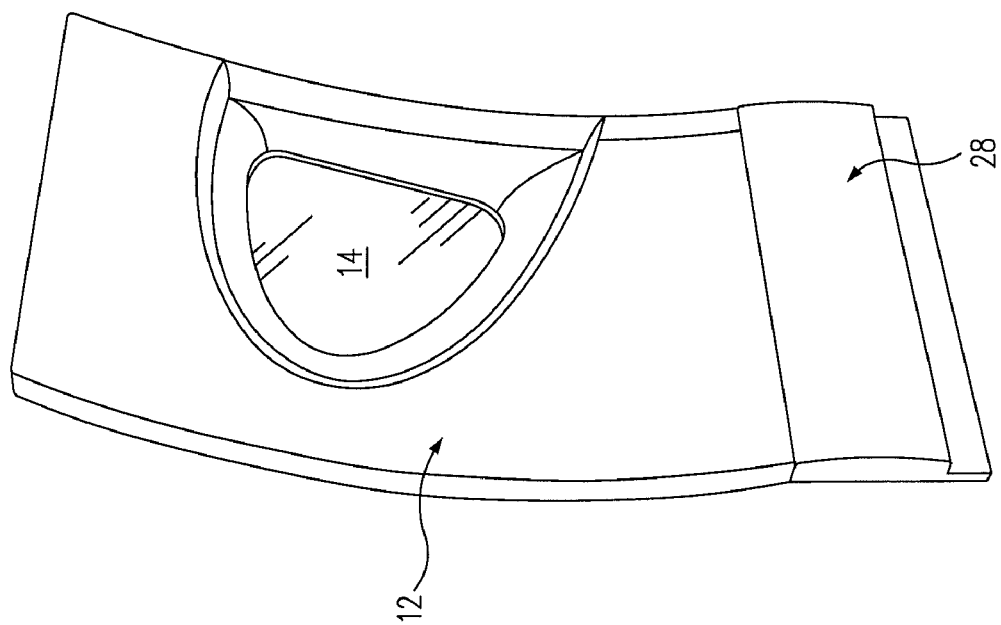
Figure 4:
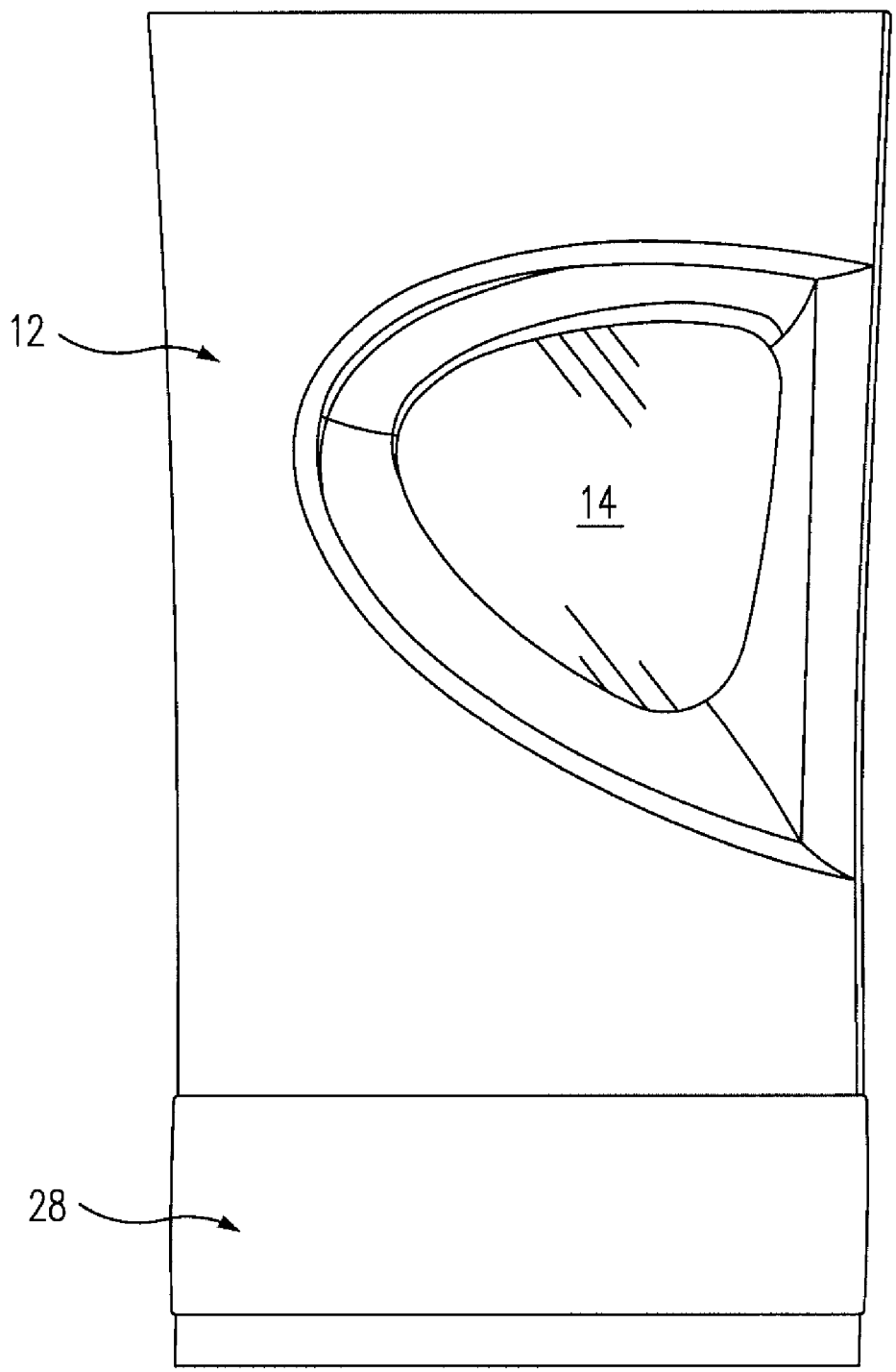
FIG. 4 is an inboard elevation view of the structural panel of FIGS. 3A and 3B.
Figure 5:
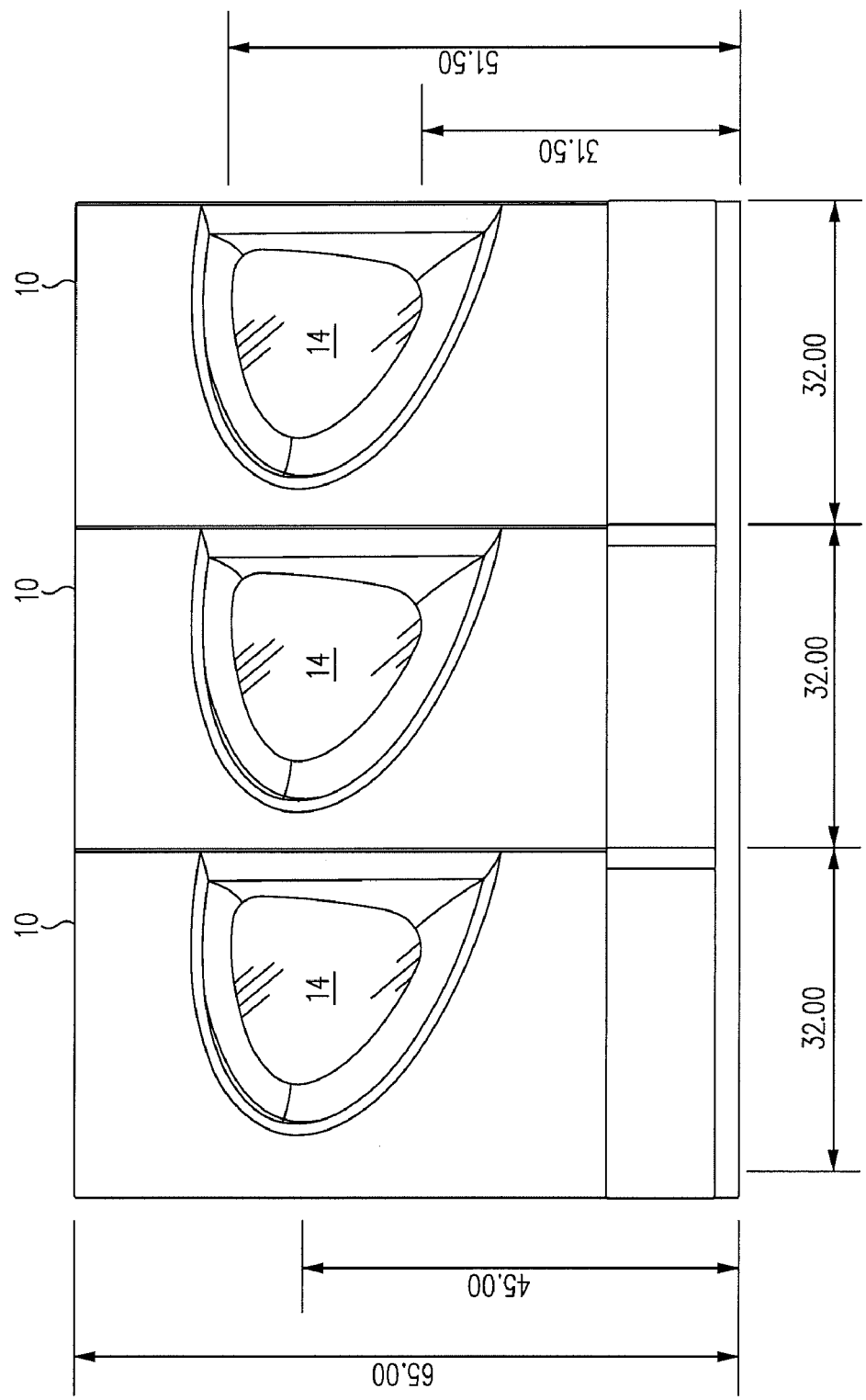
FIG. 5 is an inboard elevation view of an exemplary installation of a plurality of the exemplary panel assemblies of FIG. 1, showing some exemplary modular dimensions thereof.
Figure 6:
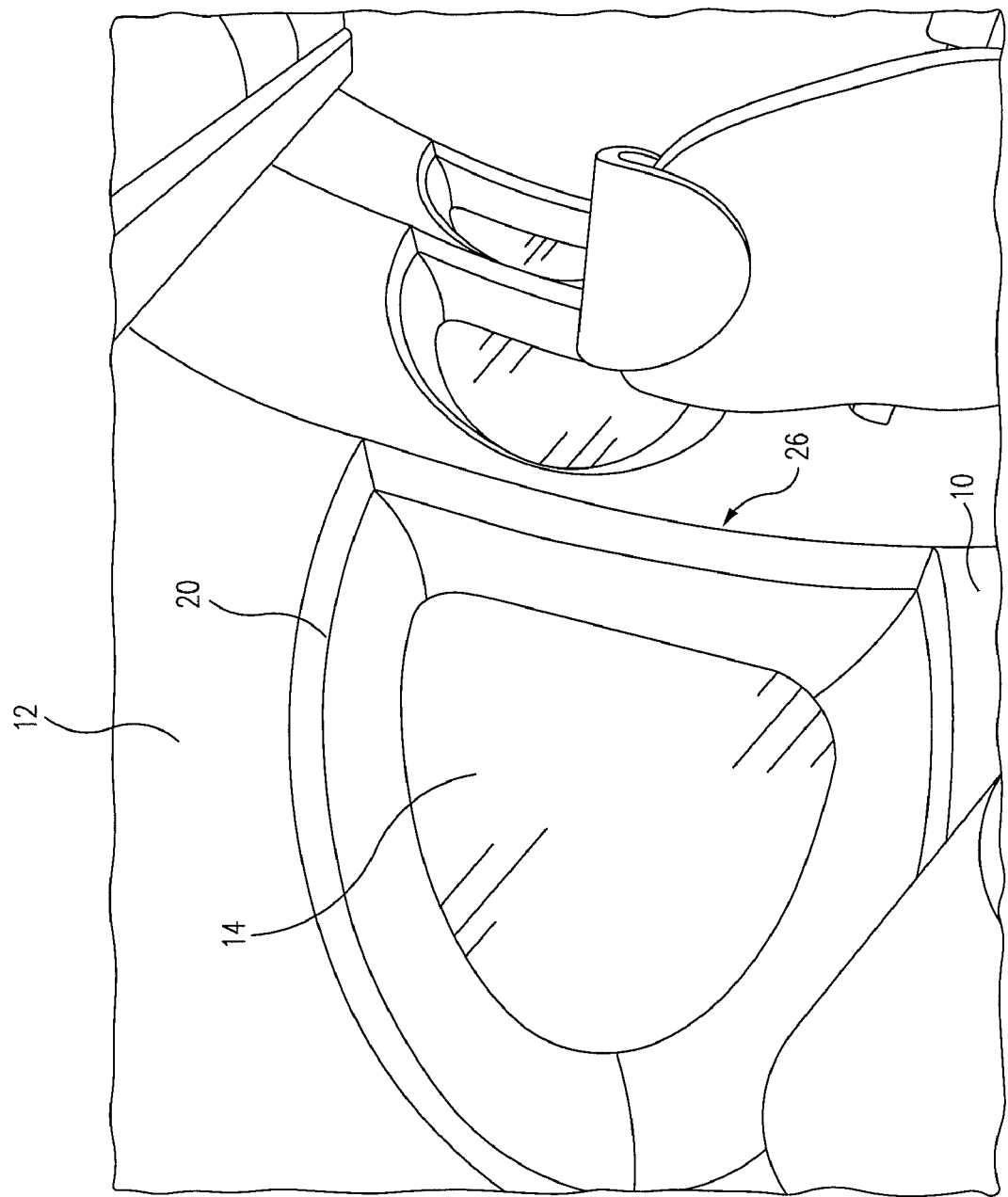
FIG. 6 is a partial perspective view looking forward of an assembly of panels of the exemplary paneling system, showing the enhanced viewing provided to shorter and taller passengers, and those situated in inboard seats disposed away from the window.
Figure 7:
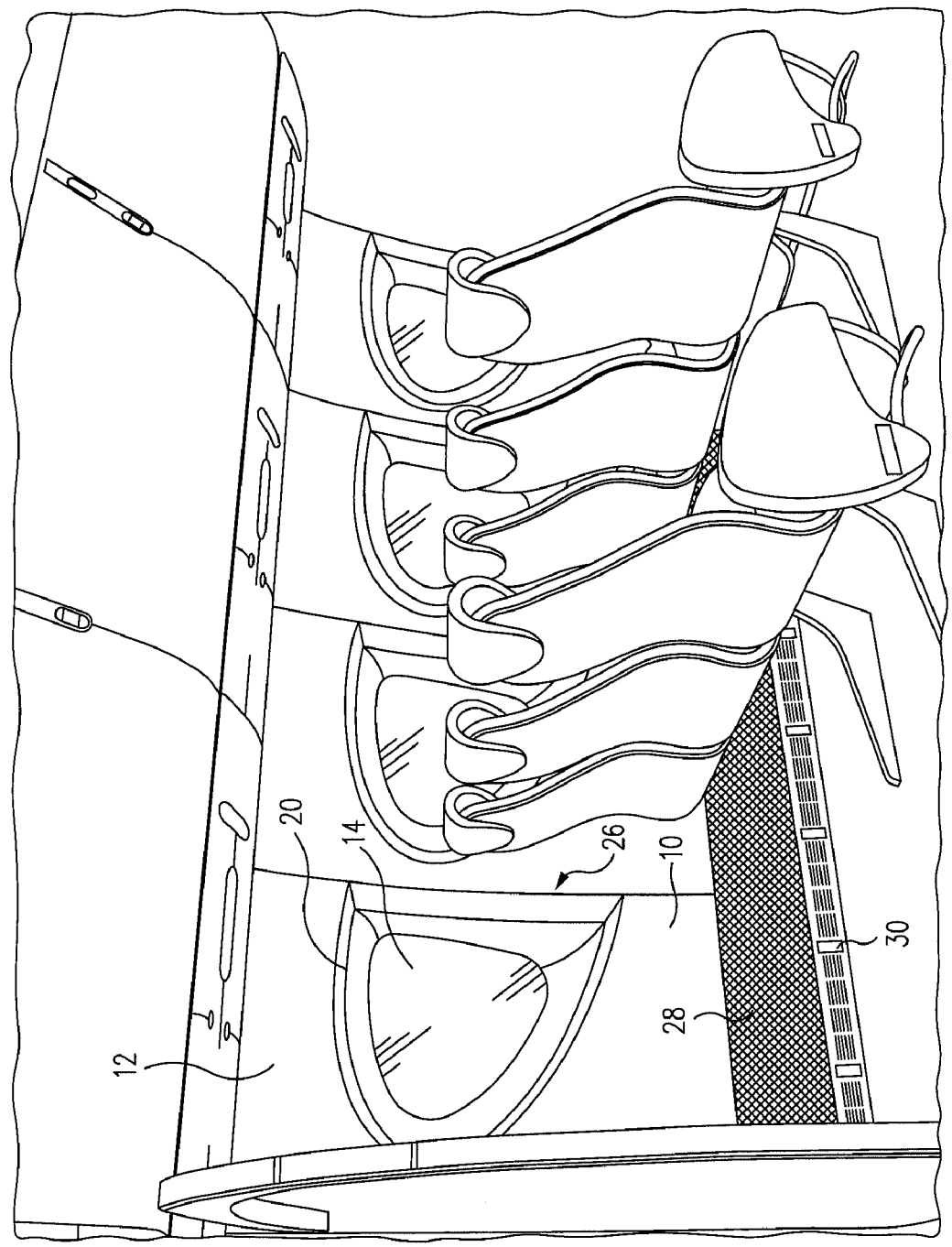
FIG. 7 is a partial perspective view looking outboard and forward of an aircraft cabin compartment with fore and aft bulkheads and incorporating the novel paneling system, with a rear row of seats removed to fully reveal a first panel assembly thereof.
Figure 8:
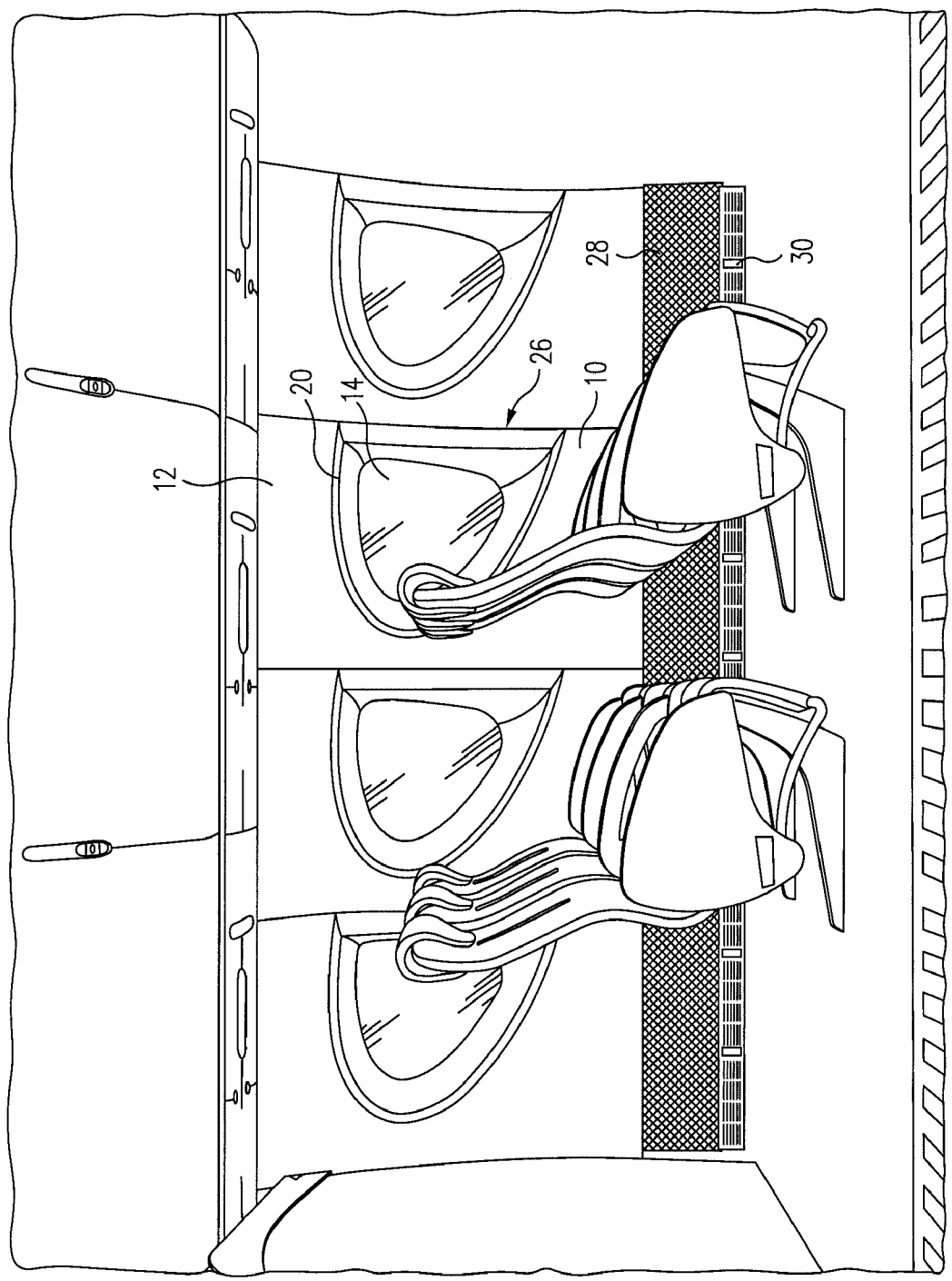
FIG. 8 is a partial outboard elevation view of the cabin compartment of FIG. 7, showing the position of the panel assemblies relative to the transverse seat rows thereof.
Figure 9:
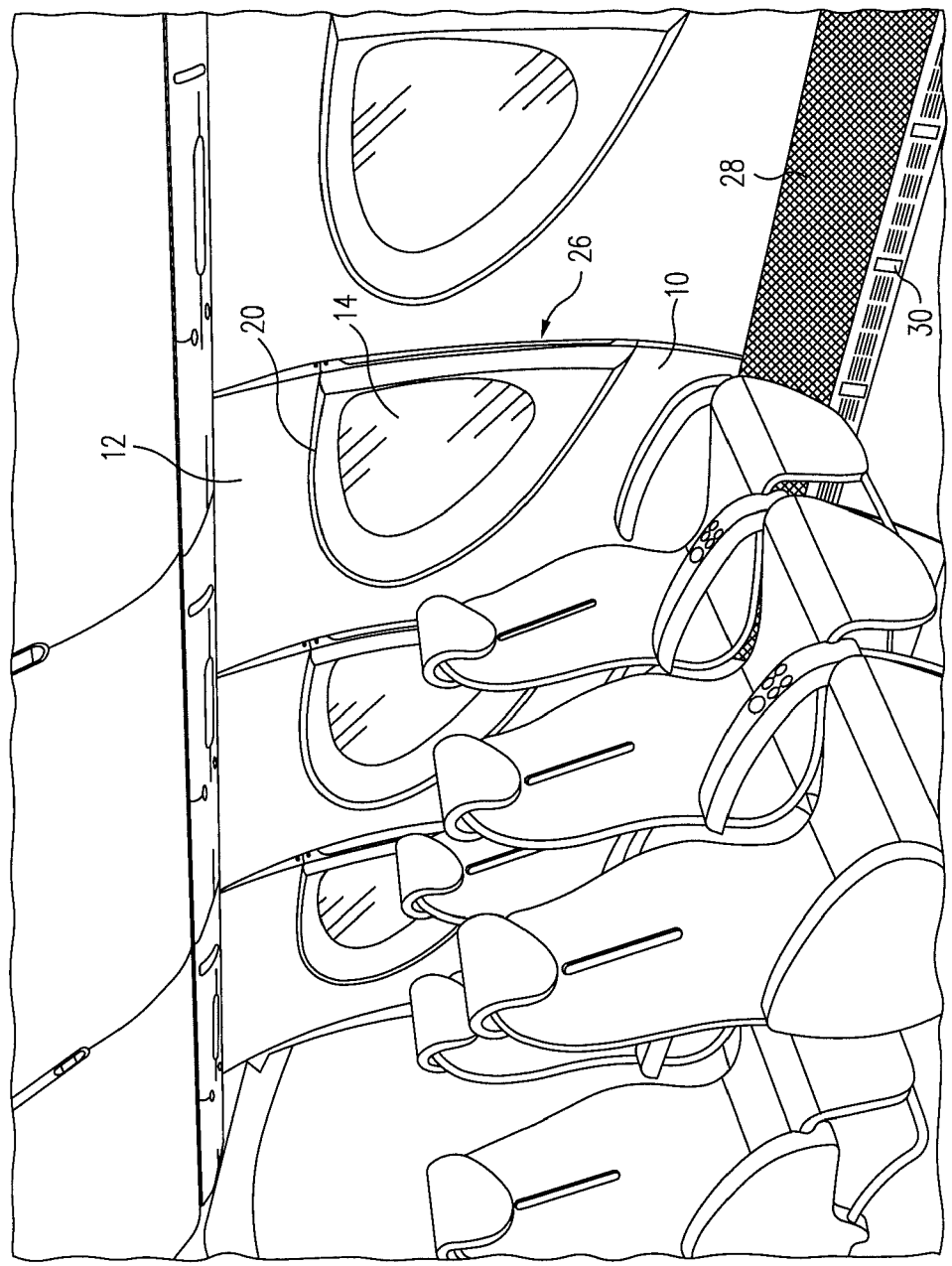
FIG. 9 is a partial perspective view looking outboard and rearward of the cabin compartment of FIG. 7, with a front row of seats removed to fully reveal a last panel thereof, and showing the indirect light patterns formed by the lighting modules of the respective panel assemblies.
Figure 10:
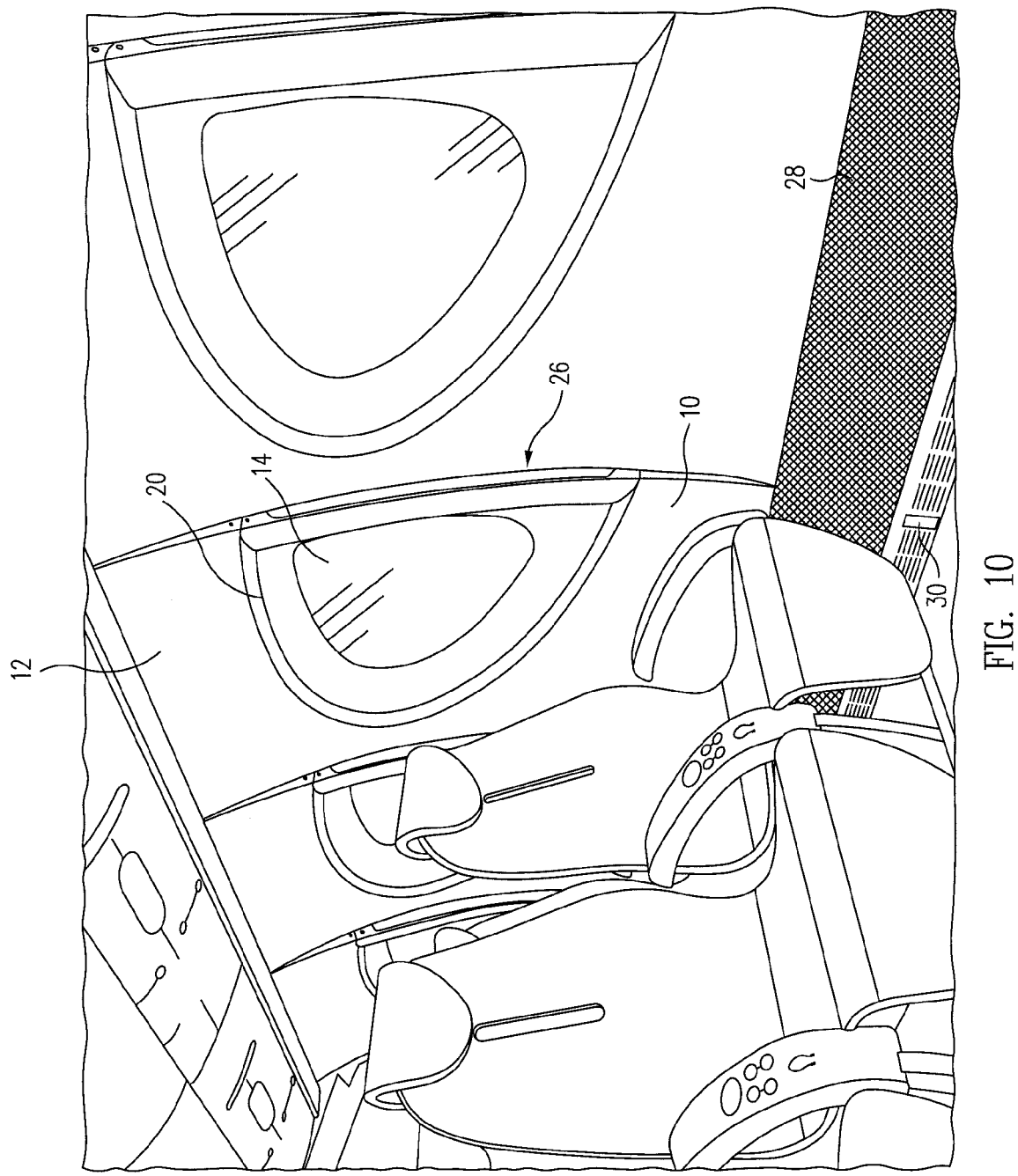
FIG. 10 is a partial enlarged perspective view similar to FIG. 9, showing the indirect lighting patterns formed by the lighting modules.

As illustrated in FIGS. 1 and 2, the exemplary panel assembly 10 comprises an outwardly curved, generally planar structural sidewall panel 12 formed of, e.g., a molded plastic, such as polycarbonate or polyurethane, or alternatively, a fiber reinforced matrix, such as glass or carbon fibers embedded in an epoxy resin matrix, that includes an elongated, D-shaped window opening 14 having an apex, or point of greatest curvature, which is directed rearward and tilted slightly upward relative to the horizontal, as illustrated in, e.g., the inboard elevation views of FIGS. 4, 5 and 8. The sidewall panel is curved outwardly to conform generally to the curvature of the aircraft fuselage (not illustrated), and as illustrated in FIGS. 3A and 3B, the window opening 14 is recessed into the panel so as to protrude outboard therefrom. The window opening 14 corresponds in size, shape and location to a corresponding opening (not illustrated) in the outer skin of the aircraft's fuselage.

As illustrated in FIGS. 1 and 2, the panel assembly 10 further includes a window assembly, comprising a transparent window lens 16 having an opaque window reveal 18 extending around its outer periphery, a seal 20 that forms a pressure-tight seal of the window lens 16 to the sidewall structural panel 12, and an opaque, passenger-adjustable window shade 21 that is slidably moveable across the window opening 14 so as to block the passage of light therethrough.

Figure 11:
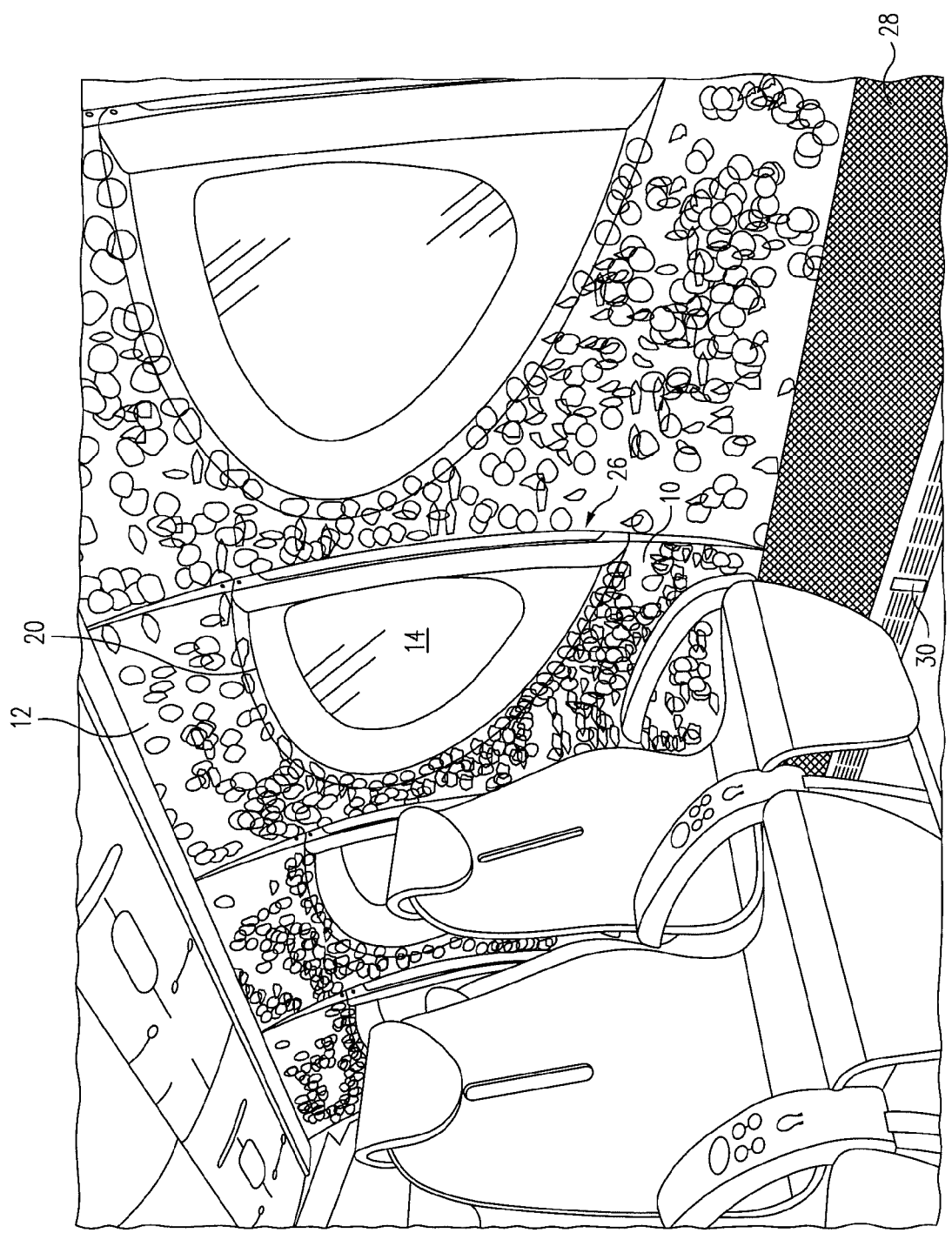
FIG. 11 is a partial perspective view similar to FIG. 10, showing an optional ornamental pattern formed on the panels and the indirect lighting patterns formed thereon by the lighting modules of the respective panel assemblies when operating in a dimmed cabin mode; and, FIG. 12 is a partial perspective view similar to FIG. 11, showing the indirect lighting patterns formed by the lighting modules when operating in a bright cabin mode.
Figure 12:
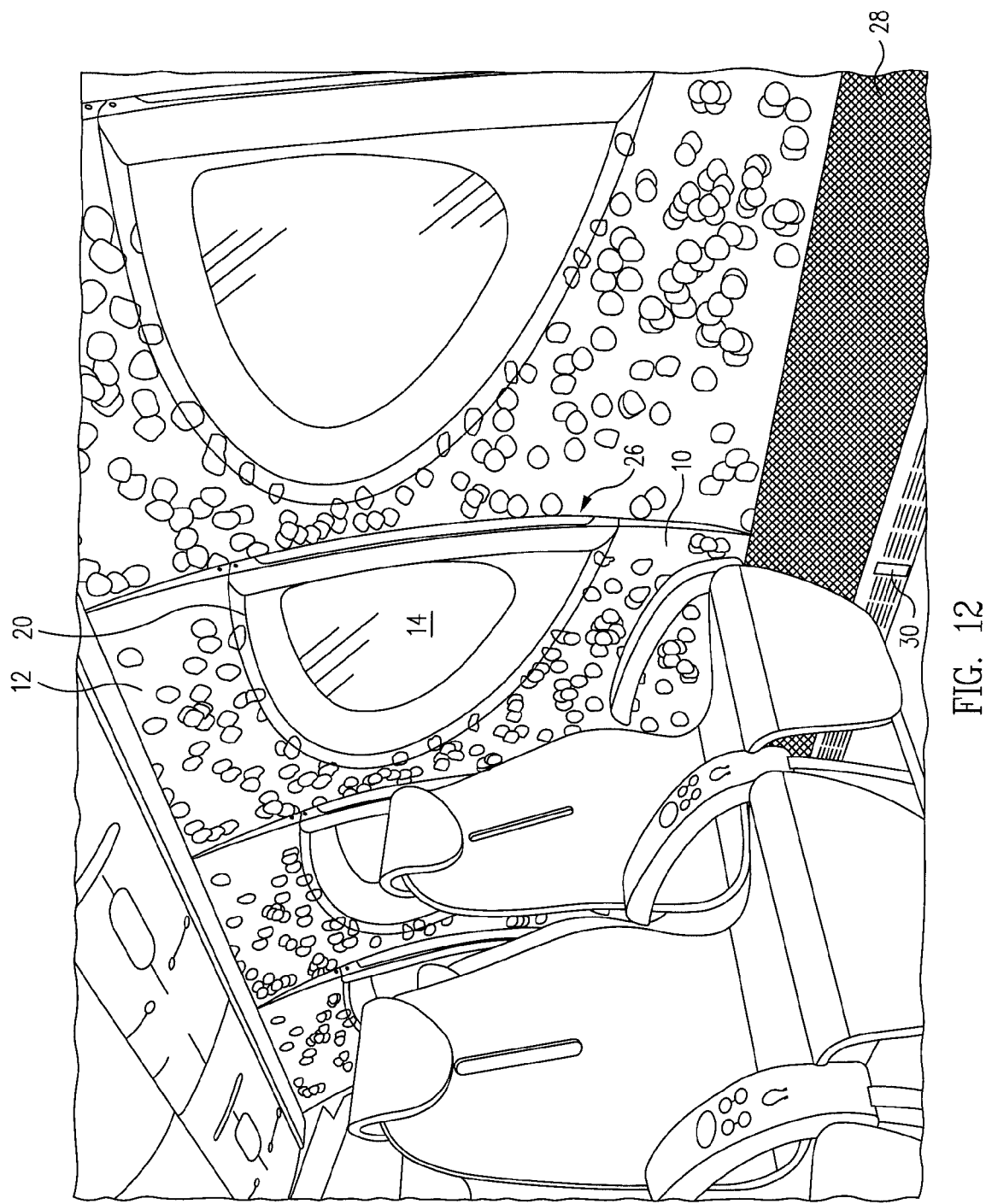

The panel assembly 10 further incorporates a novel indirect lighting fixture, or lighting module 22, which is, in the particular exemplary embodiment illustrated in the figures, disposed at the forward edge, or straight end portion, of the D-shaped window assembly, although locations within the panel assembly are also possible. The lighting module includes one or more light source (not illustrated), such as one or more incandescent or fluorescent lamps, or alternatively, an array of light emitting diodes, the light output intensity and color of which can be varied remotely, e.g., by a cabin attendant, as well as a light bezel 24 and a light lens 26. Unlike the direct cabin lighting of the prior art described above, which radiates from a location above the sidewall and washes down the panel, the light bezel 24 of the lighting module of the exemplary panel assembly 10 blocks the direct radiation of light into passenger's eyes, and instead, directs it forward and through the light lens 26 of the lighting module, such that the light washes onto the rear aspect of the structural panel 12 of the next adjacent panel assembly 10 immediately forward of the light module, as illustrated in, e.g., FIGS. 11 and 12, or onto other areas of the cabin interior.

The exemplary panel assembly 10 further includes a kick panel 28 at its lower margin, which in one embodiment, can be formed integral to the sidewall structural panel 12, and in an alternative embodiment, can be provided independently of the panel and attached to the panel later. The kick panel may be provided in modular lengths that are the same as or different than the width of the structural panel. Additionally, the kick panel 28 can incorporate the ducts and venting or grillwork of the cabin ventilation and/or decompression system. Further, the kick panel can provide the location and mounting for one or more indirect accent light lighting sources 30 that radiate light onto the cabin floor and at the feet of seated passengers, such that they can better see where to place their feet and find carryon luggage and other items stowed on the floor of the cabin beneath the seats.

FIG. 5 is an inboard elevation view of one particular exemplary installation of a plurality of the panel assemblies 10, showing some exemplary modular dimensions thereof. The panel assemblies are installed in a such a way that their side edges overlap each other, shingle fashion, by approximately 2 inches, where they are attached to each other and to underlying air-craft fuselage structure, e.g., circumferential risers or former rings. However, as those of skill in the art will appreciate, the dimensions of the panels assemblies, including the amount of their overlap, can vary widely from those shown, depending on the particular aircraft in which they are installed.

The exemplary aircraft interior sidewall paneling system of the present disclosure provides the following advantages, among many others:

1) The forward-facing, wash/accent lighting of the lighting modules 22, which can be effected with either white light or mixtures of colors of light from various colored LEDs, provides a sculptured, shingled look of overlapping panes that creates the impression of generous shoulder/elbow space in the aircraft cabin, as illustrated in the perspective views of an exemplary aircraft cabin interior illustrated in FIGS. 6-12, while avoiding the harsh glare of the direct wall lighting of the prior art described above, since the forward-facing wash lights 22 are not visible to seated passengers. Additionally, the light from the light modules can be arranged to change color independently during boarding so as to create visible "color zones" to aid passengers in, e.g., finding their respective seats more quickly.

2) The large, D-shaped windows provide a substantially larger viewing angle for passengers not seated immediately adjacent to a window.

3) The accent floor lighting of the floor panel lighting assemblies 30 illuminate the area at the feet of the seated passengers, as well as baggage and carryon items stowed beneath the passenger seats, and the floor level lighting can also provide low-level, non-glare lighting for passenger sleeping during extended night flights.

4) The overlapping sidewall panel assemblies 10 allow a substantial degree of flexibility during installation, taking up minor misfits due to change of contour and tolerances in the presence of non constant airplane sections.

As those of skill in this art will by now appreciate, many modifications, substitutions and variations can be made in the applications, materials, methods and implementations of the modular aircraft paneling system of the present invention without departing from its spirit and scope. In light of this, the scope of the present invention should not be limited to that of the particular embodiments illustrated and described herein, as they are only by way of some examples thereof, but instead, should be fully commensurate with that of the claims appended hereafter and their functional equivalents.

What is claimed is:

1. An aircraft interior cabin sidewall panel assembly, comprising:
 a generally planar sidewall structural panel having a D-shaped window opening with an apex that is directed rearward and tilted slightly upward relative to the horizontal;
 a window assembly disposed in the window opening;
 a lighting module disposed at a front edge of the window assembly and arranged to direct light forwardly such that the light washes onto a rear margin, of a structural panel of a next adjacent panel assembly located immediately forward of the light module, the lighting module including means for preventing the light from radiating directly into the eyes of passengers; and,
 a kick panel disposed at a lower margin of the structural panel.

2. The panel assembly of claim 1, wherein the structural panel comprises a polycarbonate, polyurethane, or a fiber reinforced matrix.

3. The panel assembly of claim 2, wherein the structural panel includes an ornamental pattern disposed on an inboard surface thereof.

4. The panel assembly of claim 1, wherein the window assembly comprises:
 a transparent window lens having an opaque window reveal extending around an outer periphery thereof;
 a seal forming a pressure-tight seal of the lens to the sidewall structural panel; and,
 an opaque, passenger-adjustable window shade slidably moveable across the window opening so as to block the passage of light therethrough.

5. The panel assembly of claim 1, wherein the lighting module comprises:
 one or more light sources;
 a bezel disposed on an inboard side of the lighting module; and,
 a transparent light module lens.

6. The panel assembly of claim 5, wherein the light sources comprise incandescent lamps, fluorescent lamps, or light emitting diodes (LEDs).

7. The panel assembly of claim 5, wherein the intensity, the color or both the intensity and the color of the light output by the light sources can be varied remotely.

8. The panel assembly of claim 1, wherein the kick panel is formed integrally with the structural panel.

9. The panel assembly of claim 1, wherein the kick panel incorporates ducts and vents for cabin ventilation, decompression, or for both cabin ventilation and decompression.

10. The panel assembly of claim 1, wherein the kick panel includes an accent light adapted to direct light onto a cabin floor of the aircraft.

11. An aircraft having a plurality of the internal sidewall panel assemblies of claim 1 installed on an interior cabin sidewall thereof.

12. An aircraft, comprising:
 a plurality of sidewall panel assemblies having laterally overlapping side edges attached to an interior sidewall of a cabin of the aircraft, each panel assembly comprising:
 a generally planar sidewall structural panel having a D-shaped window opening with an apex that is directed rearward and tilted slightly upward relative to the horizontal;
 a window assembly disposed in the window opening;
 a lighting module arranged to direct light onto an interior surface of the aircraft cabin, the lighting module including means for preventing the light from radiating directly into the eyes of passengers; and,
 a kick panel disposed at a lower margin of the structural panel, the kick panel including an accent light adapted to direct light onto a cabin floor of the aircraft.

13. The aircraft of claim 12, wherein the lighting module is disposed at a forward edge of the window assembly and arranged to direct light forwardly such that the light washes onto a rear margin of a structural panel of a next adjacent panel assembly located immediately forward of the light module.

14. The aircraft of claim 12, wherein the kick panel is formed integrally with the structural panel.

15. The aircraft of claim 12, wherein the kick panel incorporates ducts and vents for cabin ventilation, cabin decompression, or both cabin ventilation and decompression.

16. A passenger window and interior cabin wash light assembly for a passenger aircraft, comprising:
 a transparent, D-shaped window lens having an apex that is directed rearward and tilted slightly upward relative to the horizontal;
 an opaque window reveal extending around an outer periphery of the lens;
 a seal forming a pressure-tight seal of the outer periphery of the lens to a sidewall structural panel of the aircraft;
 an opaque, passenger-adjustable window shade slidably moveable across the window opening so as to block the passage of light therethrough; and,
 a lighting module disposed at a forward edge of the D-shaped window assembly and arranged to direct light forwardly such that the light washes onto a rear margin of a structural panel of a next adjacent aircraft sidewall structural panel assembly located immediately forward of the light module, the lighting module including means for preventing the light from radiating directly into the eyes of passengers.

17. The window and wash light assembly of claim 16, wherein the lighting module comprises:
 one or more light sources;
 a bezel disposed on an outer side of the lighting module; and,
 a transparent light module lens.

18. The window and wash light assembly of claim 17, wherein the light sources comprise incandescent lamps, fluorescent lamps, or light emitting diodes (LEDs).

19. The window and wash light assembly of claim 17, wherein the intensity, the color or both the intensity and the color of the light output by the light sources can be varied remotely.

* * * * *